United States Patent

Tyson et al.

[11] Patent Number: 6,053,073
[45] Date of Patent: Apr. 25, 2000

[54] POSITIVE ACTING DIFFERENTIAL WITH MULTIPLE PINION PINS

[75] Inventors: Mark V. Tyson, Balboa Island; Valentine Cucu, Long Beach; Peter A. Dickey, Costa Mesa, all of Calif.

[73] Assignee: Vehicular Technologies, Inc., Costa Mesa, Calif.

[21] Appl. No.: 09/311,839

[22] Filed: May 14, 1999

[51] Int. Cl.[7] .................................................. F16H 48/12
[52] U.S. Cl. ............................................. 74/650; 192/200
[58] Field of Search ............................... 74/650; 192/200

[56] References Cited

U.S. PATENT DOCUMENTS

| | | |
|---|---|---|
| 1,529,804 | 3/1925 | Nogrady . |
| 2,545,601 | 3/1951 | Brubaker . |
| 2,638,794 | 5/1953 | Knoblock . |
| 2,667,087 | 1/1954 | Myers . |
| 2,667,088 | 1/1954 | Myers . |
| 2,830,466 | 4/1958 | Myers . |
| 2,855,806 | 10/1958 | Fallon . |
| 3,131,578 | 5/1964 | Elliott . |
| 3,397,593 | 8/1968 | Knoblock . |
| 3,791,238 | 2/1974 | Bokovoy . |
| 4,104,931 | 8/1978 | Tomich . |
| 4,159,656 | 7/1979 | Tomich . |
| 4,424,725 | 1/1984 | Bawks . |
| 4,524,640 | 6/1985 | Neumann . |
| 4,557,158 | 12/1985 | Dissett . |
| 4,621,540 | 11/1986 | Davison . |
| 4,745,818 | 5/1988 | Edwards . |
| 5,413,015 | 5/1995 | Zentmyer . |
| 5,590,572 | 1/1997 | Valente . |
| 5,603,246 | 2/1997 | Zentmyer . |
| 5,637,049 | 6/1997 | Zentmyer . |
| 5,836,220 | 11/1998 | Valente . |
| 5,901,618 | 5/1999 | Tyson et al. ............................... 74/650 |
| 5,983,754 | 11/1999 | Tyson et al. ............................... 74/650 |

*Primary Examiner*—Khoi Q. Ta
*Attorney, Agent, or Firm*—Blakely, Sokoloff, Taylor & Zafman LLP

[57] ABSTRACT

A positive acting differential which automatically connects the two axles together to provide optimum traction for the vehicle, yet releases one axle when the vehicle is proceeding around a curve without drive wheel slippage, whereby only a single axle is engaged through the drive system. The positive acting differential includes a ring structure which, for the disengaged wheel, will shift to a position preventing the driver and coupler teeth from engaging in the normal manner, thereby alleviating the noise and harsh operating characteristic known as "cycling" associated with locking types of differentials. A spacer with attached paddles supports multiple pinion pins. The paddles loosely couple the motion of the pinion pins to the ring structure. A preferred and an alternate embodiment are disclosed.

22 Claims, 13 Drawing Sheets

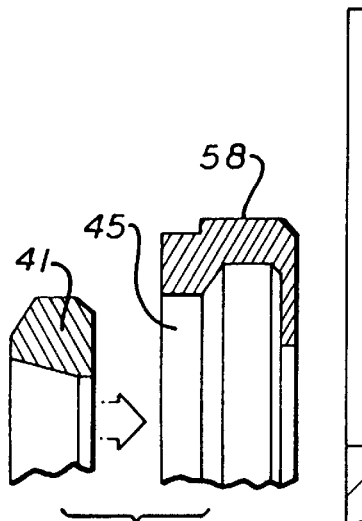
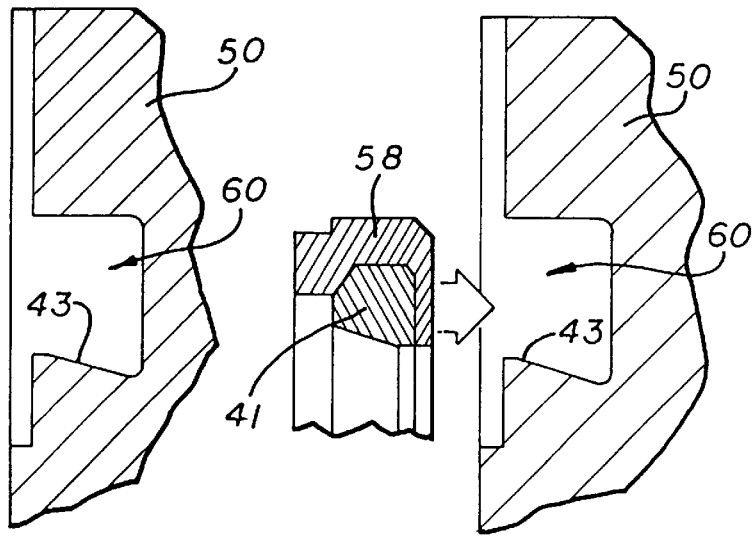
FIG. 5A                    FIG. 5B
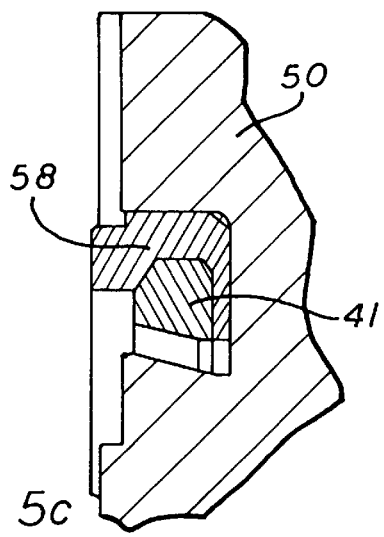
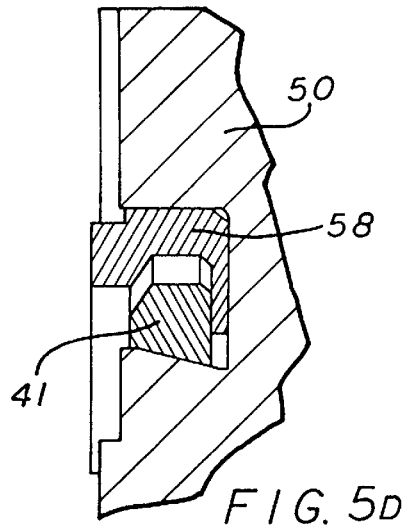
FIG. 5C                    FIG. 5D
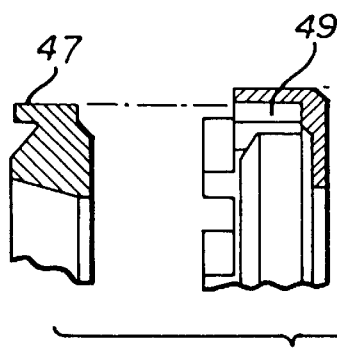
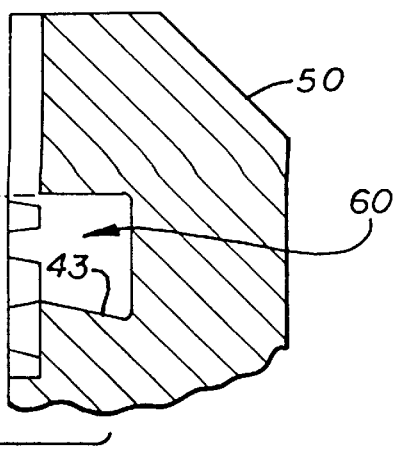
FIG. 5E

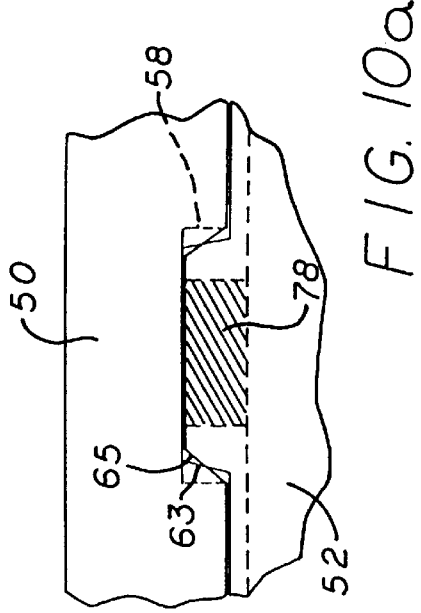
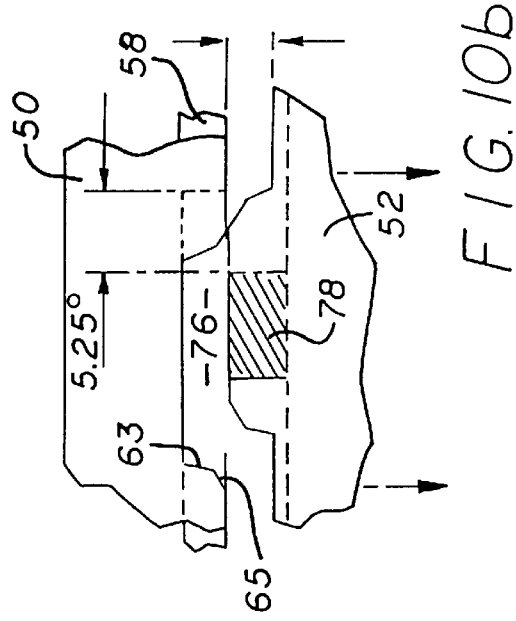
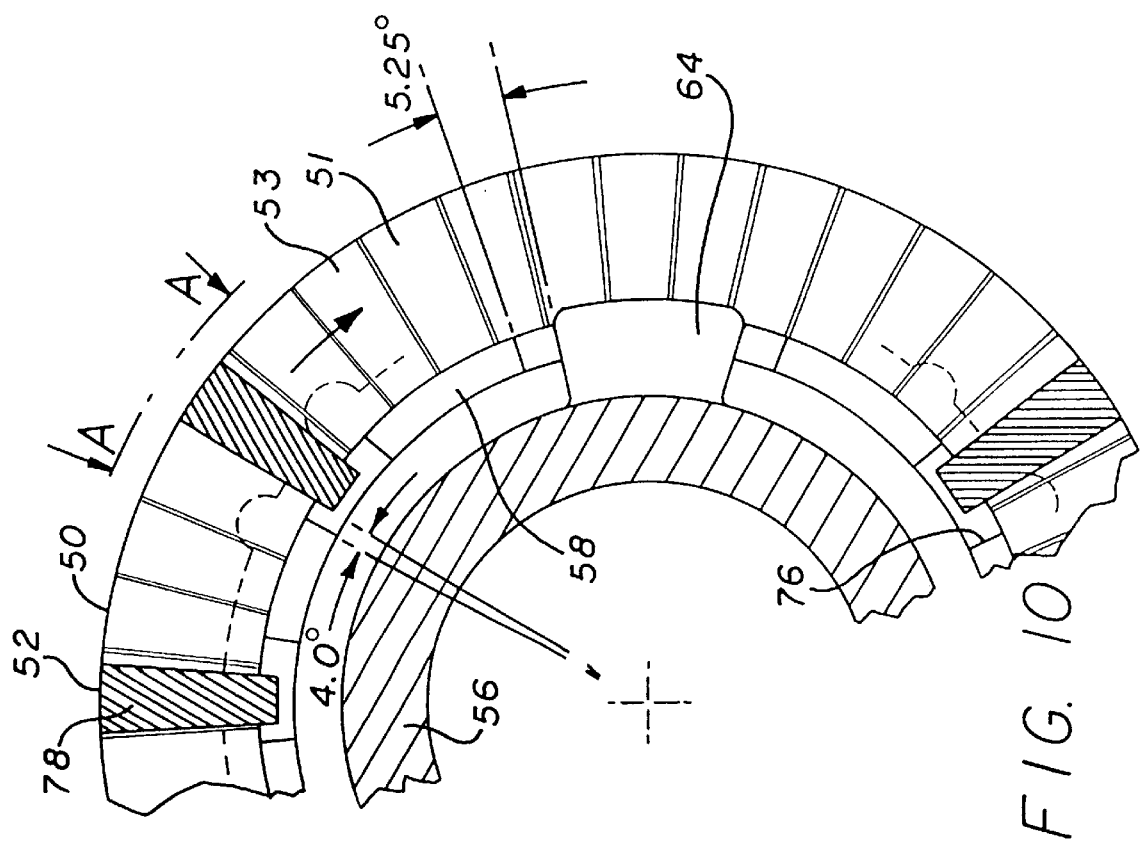

POSITIVE ACTING DIFFERENTIAL WITH MULTIPLE PINION PINS

BACKGROUND OF THE INVENTION

1. Field of the Invention

The present invention relates to the field of positively acting differentials for motor vehicles.

2. Prior Art

Land vehicles, such as automobiles, trucks, buses and the like, typically utilize what has become known as an "open differential" for the final drive system. In such a differential, bevel gears are coupled to the inner ends of left and right collinear axles. These bevel gears engage accompanying bevel gears mounted on pinion pins in a differential case. The differential case, in turn, has a ring gear thereon, with the ring gear and differential case being driven in rotation about the axis of the axles by a pinion gear on the drive shaft. The angular velocity of the ring gear and differential case determines the average angular velocity of the two axles. However, the bevel gearset within the differential case between the two axles allows one axle to turn faster and the other axle to turn slower than the ring gear and differential case at any particular time. This, of course, is highly desirable in normal driving, as it allows the axle coupled to the outer wheel to rotate faster than the axle coupled to the inner wheel when going around a curve or turning a sharp corner. It also causes the drive system to deliver the same drive torque to each of the two axles to avoid a tendency for the vehicle to pull to one side or the other when power is applied or removed. The amount of torque that can be transmitted through an open differential is limited to that able to be carried by the wheel with the least amount of traction.

There are certain situations, however, where the aforementioned characteristics of an open differential become undesirable. In particular, when one wheel loses traction, the torque which will be delivered to the wheel with traction will be no higher than the torque delivered to the wheel without traction. For instance, with one drive wheel on ice and the other drive wheel on dry concrete, the torque delivered to the drive wheel on dry concrete will be no higher than can be carried by the wheel on ice. A locking differential, however, will effectively couple the two axles together so that they turn in unison, forcing rotation of the drive wheel with greater traction along with the rotation of the wheel with lesser traction. The locking differential, as opposed to the open differential, can transmit as much torque as can be carried by the wheel with the most traction. High performance vehicles, off-road vehicles and the like may similarly take advantage of the characteristics of locking differentials to improve their traction performance.

The positive acting differential of the present invention is a significant improvement in a prior art locking differential manufactured by Vehicular Technologies, Inc., assignee of the present invention, and sold under the trademark "Performance." That prior art device is shown in the exploded view of FIG. 1. While FIG. 2 is a view of the assembled differential of the present invention, the improvements of the present invention are mostly internal to the assembly of FIG. 2, and accordingly, FIG. 2 is suggestive of the next higher assembly of the parts of FIG. 1. Referring to FIG. 1, the splined inner end of an axle (not shown) engages mating splines in a coupler 22, with a similar coupler 22 at the opposite side of the assembly similarly mating at the inner end of the other axle (not shown). The axles are retained in position by bearings adjacent to wheel ends of the axles and other means.

A locking differential reuses some components of the open differential supplied with the vehicle. In particular, the pinion pins 34, 39 that carry the bevel gears of the open differential may be reused although the bevel gears are not used. For this reason, the pins 34, 39 are referred to as pinion pins even though they do not carry gears in a locking differential of the type shown.

The couplers 22 have a plurality of teeth on the face thereof which may mate with corresponding teeth on the faces of drivers 30, depending upon the axial position of the drivers. The drivers 30, in turn, have saddle-shaped depressions 32 on the opposite faces thereof for loosely surrounding the pinion pins 34, 39 driven by the differential case 54. (See FIG. 2 for the position of the pinion pins in the overall differential assembly.) The drivers 30 each have springs 36 in angled blind holes in the driver, the springs acting on pins 34, 39 to both elastically encourage the drivers to a position having the pins 34, 39 aligned with the center of the saddle-shaped depressions, and to elastically encourage the drivers axially outward away from the pins 34, 39 into engagement with the couplers. Pins 40 on the drivers 30 fit within blind holes 42 on the opposing face of the opposite driver and function to control the angular displacement of the drivers to each other.

The drivers 30 must be in close axial alignment with the couplers 22 and be free to move axially to allow engagement and disengagement from the adjacent coupler to provide the locking differential action. The outer diameters of the splined ends of the axles 20 typically do not provide a suitable locating surface for the drivers. A spacer 38 establishes and retains the drivers 30 in axial alignment with the couplers 22 and provide sliding surfaces for the drivers. The spacer also serves as the support for the inner ends of the secondary pinion pins 39.

In the final assembly, the springs 36 encourage the toothed face of the drivers 30 into engagement with the toothed face of couplers 22, and there is sufficient clearance between the saddle-shaped depressions 32 and pins 34, 39 in the final assembly for either driver to move toward the pins 34, 39 sufficiently to allow the teeth of a driver 30 to ride over the teeth of the associated coupler 22.

The operation of the prior art device may be explained as follows. With the teeth of the corresponding driver and coupler pairs engaged, the differential housing may rotate, carrying the pinion pins 34, 39 from contact with one side of the saddle to the other, a displacement of (depending on the size of the design) 4 to 7 degrees. This free travel, or backlash, is essential for correct positioning of the differential components during the transition from driving to coasting and vice versa. The drivers are retained with respect to each other by pins 40 and mating blind holes 42 for a total rotation, one relative to the other, approximately one half of the backlash described previously. When the pinion pins 34, 39 engage the saddle-shaped depressions 32 on either driver, the force of the contact, by design of the saddles, will be angled outward from the plane of the respective driver and will overcome the component of the reaction force acting opposite created by the inclined edges on the mating teeth on the drivers 30 and couplers 22. For example, saddle angles ranging from 30 to 40 degrees are typically used and create outward axial forces that exceed the inward axial forces created by typical 20 to 25 degree inclines of the coupler and driver mating teeth that would otherwise work to separate the driver from the coupler.

Using the foregoing parameters, consider first the vehicle at rest. Assume the two drivers 30 each engage with the respective coupler 22, and for specificity in the starting condition, that the pinion pins 34, 39 are centered in the saddle-shaped depressions 32 in the drivers 30. With the vehicle in gear and engine driving, the pinion pins 34, 39 begin to rotate about the axis of the axle, through the backlash present and compressing against springs 36 to contact the edges of the saddle-shaped depressions 32 in the drivers, and then on further rotation, to force the drivers and couplers, and thus the axles, into rotation. Because the contact angle between the pinion pins 34, 39 and the saddle-shaped depressions 32 exceeds the angle of the edge of the teeth on the couplers and drivers, the force between the pins and the drivers forcing the same into contact against the couplers 22 will exceed the force between the inclined edges of the teeth on the drivers 30 and couplers 22 otherwise tending to force the drivers back toward pins 34, 39, so that the drivers and couplers will remain in positive engagement, regardless of the torque applied to the differential.

If the vehicle now proceeds to drive around a curve, the wheel on the outside of the curve, and thus the coupler 22 associated with that wheel, will tend to rotate faster than the coupler associated with the inside wheel. Assuming power is still being applied, this causes the driver associated with the outside wheel to begin "gaining" with respect to the pinion pins 34, 39, the driver rotating forward to a position wherein the saddle-shaped depressions 32 thereon are no longer in contact with the pinion pins 34, 39. At this point, pins 40 and mating blind holes 42 prevent the further relative rotation of the two drivers but allow coaxial translation. Further gaining of the outside wheel continues to rotate the outside coupler at a speed higher than the other differential components. Now, however, the teeth on the driver associated with the outside wheel are free to climb the inclined planes of the teeth on the driver and coupler, with the driver moving toward the pinion pins 34, 39 against the resistance of the associated springs 36 to allow the teeth of the respective driver to slide over the teeth of the respective coupler, repeatedly as required so long as the difference in wheel rotation speeds exist.

If, when in a curve, the vehicle engine is throttled back to coast and the engine is used as a braking or vehicle slowing device, the same basic interaction of parts described above will occur substantially in reverse, now however with the driver and coupler associated with the outer wheel of the curve being engaged, and the driver associated with the inner wheel of the curve climbing over the teeth on the associated coupler as required to allow the inner wheel on the curve to turn slower than the outer wheel. Similarly, in backing around a curve such as backing out of a parking place, the inner wheel will be the drive wheel, as in powering forward, whereas use of the engine to retard the motion of the vehicle when backing will engage the wheel on the outer side of the turn. However in any event, when power is applied while turning to the point that traction is lost by the drive (inside) wheel, pinion pins 34, 39 will catch up to and forcibly engage the appropriate side of the saddle-shaped depression 32 on the outside wheel driver 30, forcing both drivers into engagement with their associated couplers to force rotation of both axles in unison.

The foregoing locking differential and another manufactured by Vehicular Technologies called "Lock Right" perform well, allowing the drive wheels to rotate independently under normal conditions, but causing the wheels to rotate in unison when either wheel loses traction and begins to slip. The Lock Right design differs from the aforementioned design in that it has no springs located in the saddle to dampen the backlash, rather springs are located between the drivers and thus work directly to force the driver teeth into mesh with those on the adjacent coupler. However, these differential designs contain a few particular operating characteristics that may require the vehicle operator to become accustomed to.

In particular, when one wheel begins turning faster than the other, such as when turning into a parking space, one driver will be climbing the teeth on the associated coupler and sliding thereover. When the teeth of the driver again align with the spaces between teeth on the coupler, the driver will fall into engagement with the coupler and shortly thereafter climb the sides of the teeth and again disengage. This makes an audible noise, resulting in a "click, click, click" type sound heard from outside the vehicle. In louder vehicles, such as a high performance vehicle, particularly for one technically versed to understand the source of the sound, the sound is of little consequence. However, to the driver of a more typical, quieter car, the sound can be a distraction, and could be misinterpreted as a mechanical fault or impending mechanical failure. Secondly, a phenomenon called "cycling" can be induced in manual transmission equipped vehicles. Automatic transmissions do not exhibit the condition because the torque converter always maintains a measure of bias load between the engine and drive axle. With manual transmissions, this event occurs when turning at slow speeds with the clutch pedal depressed, such as when turning into a parking space, temporarily decoupling the transmission from the engine and therefore removing any bias load present on the engaged driver and coupler. When the disengaged driver and coupler teeth pass by each other, they briefly reengage, enabling a load to be placed on the differential and axle components. The components between the differential and the wheel then act like an undamped mechanical spring and release the energy by temporarily accelerating the differential, drive shaft and transmission components. The inertia of these components carries the differential pins against the driver saddle, causing the opposite side driver and coupler to lock and continue to process. The continual wind-up and release will build and eventually become sufficient to "rock" the vehicle driveline and require the transmission be put in neutral or the vehicle stopped in order to cease the cycling. Needless to say, this is highly undesirable and would only be acceptable to the very most forgiving of owners. However all drivers whose vehicles represent a standard "as-delivered" condition would appreciate the increased traction a locking differential provides in situations where dry pavement type traction is not available. It would therefore be desirable to provide a differential with substantially the same simplicity as the differentials just described, but which is quiet and smooth in its operation, so as to neither be heard by nor concern the average driver of a vehicle equipped with the locking differential.

BRIEF SUMMARY OF THE INVENTION

The present invention provides a positive acting differential which automatically connects the two axles together to provide optimum traction for the vehicle, yet releases one axle when the vehicle is proceeding around a curve without drive wheel slippage, whereby only a single axle is engaged through the drive system. The positive acting differential includes a ring structure which, for the disengaged wheel, will shift to a position preventing the driver and coupler teeth from engaging in the normal manner, thereby alleviating the noise and harsh operating characteristic known as "cycling" associated with locking types of differentials. A spacer with attached paddles supports multiple pinion pins.

The paddles loosely couple the motion of the pinion pins to the ring structure. A preferred and an alternate embodiment are disclosed.

BRIEF DESCRIPTION OF THE DRAWINGS

FIGS. 5a, 5b, 5c, 5d, 5e, 5f, 5g are cross sectional views of the synchro ring and drag ring taken on enlarged scale of region 5 of FIG. 4, illustrating the assembly and function of the synchro ring and drag clip.

FIG. 10 is a view similar to FIG. 9, illustrating the relative part positions as the coupler being illustrated continues to rotate faster than the coupler for the wheel still being driven and the teeth on the driver 52 begin to climb the teeth on the coupler 50.

FIGS. 10a and 10b illustrate the extended teeth 78 and the driver 52 relative to the slot in the synchro ring 58 before the climbing of the teeth on the coupler 50 begins, and again just after climbing has been completed.

DETAILED DESCRIPTION OF THE INVENTION

Figure 1:
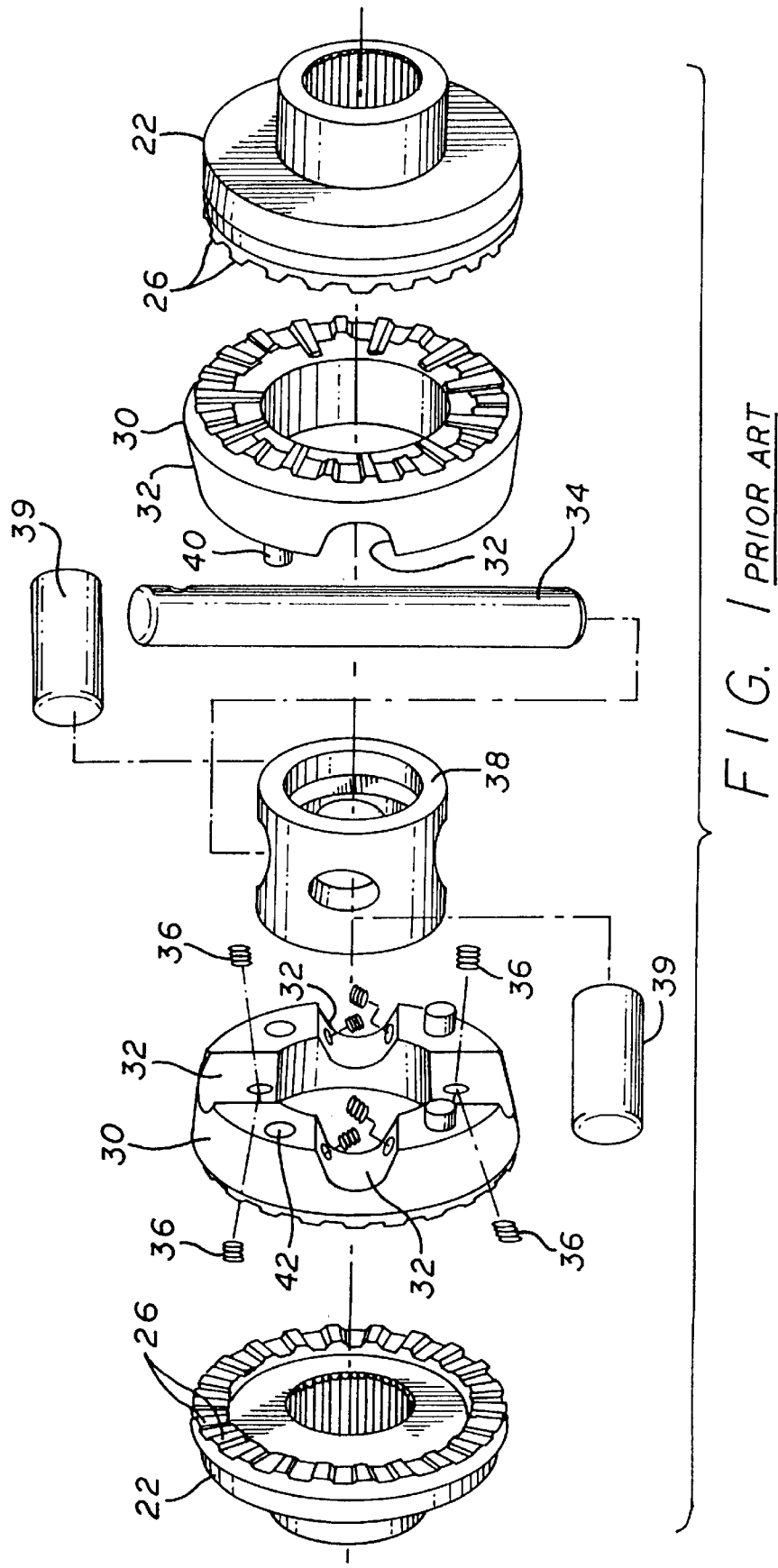
FIG. 1 is an exploded perspective view of a prior art locking differential with multiple pinion pins.
Figure 2:
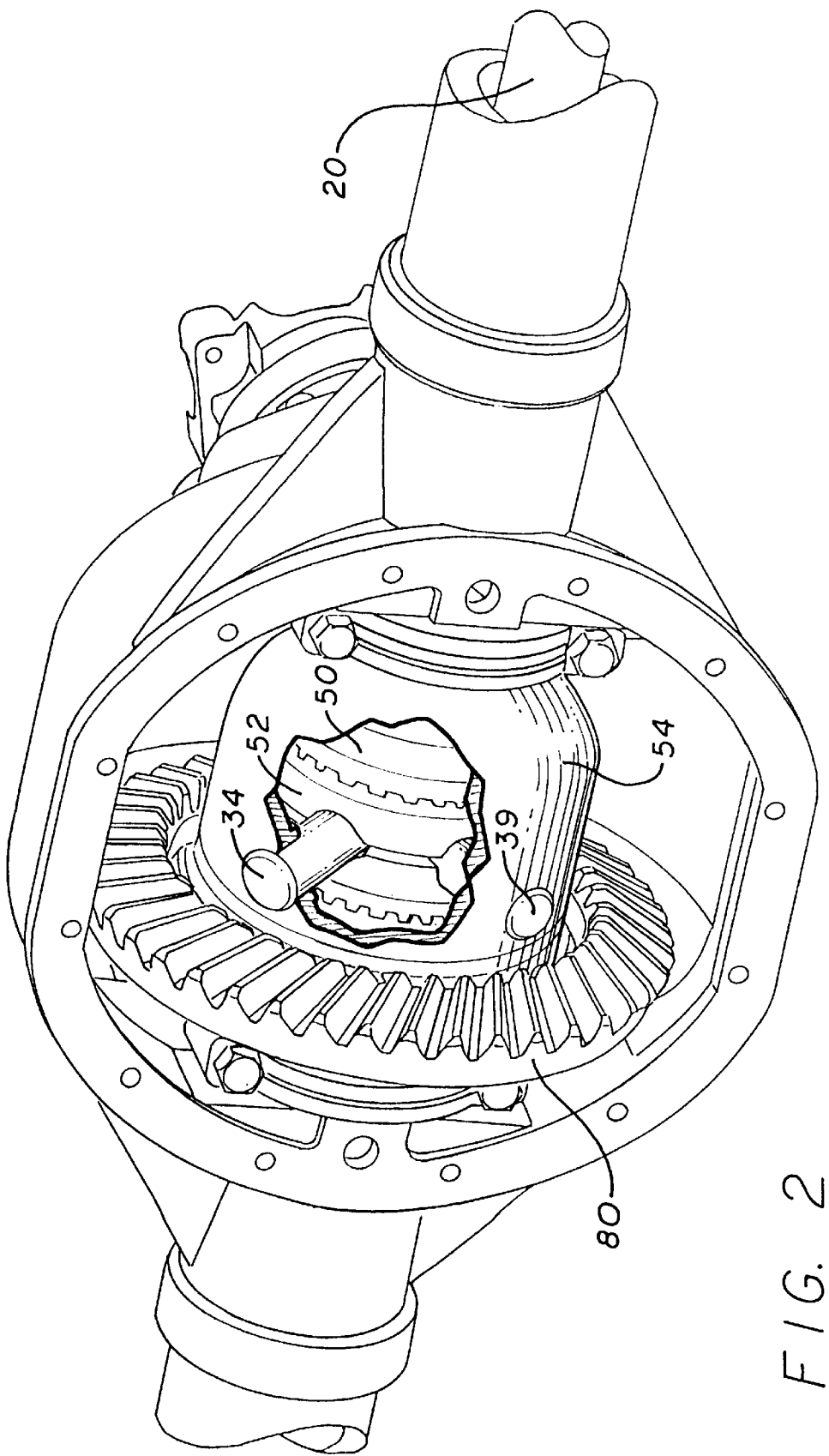
FIG. 2 is a rear view, cover off, of a positive acting differential incorporating the present invention.

Referring to FIG. 2, a differential incorporating the present invention may be seen. However, the improved parts of the differential of the present invention are not visible in this Figure. One embodiment of the differential shown in FIG. 2 is shown in an exploded view in FIG. 3, similar to the exploded view of the prior art locking differential of FIG. 1, but further illustrating the improvements of the present invention.

Figure 3:
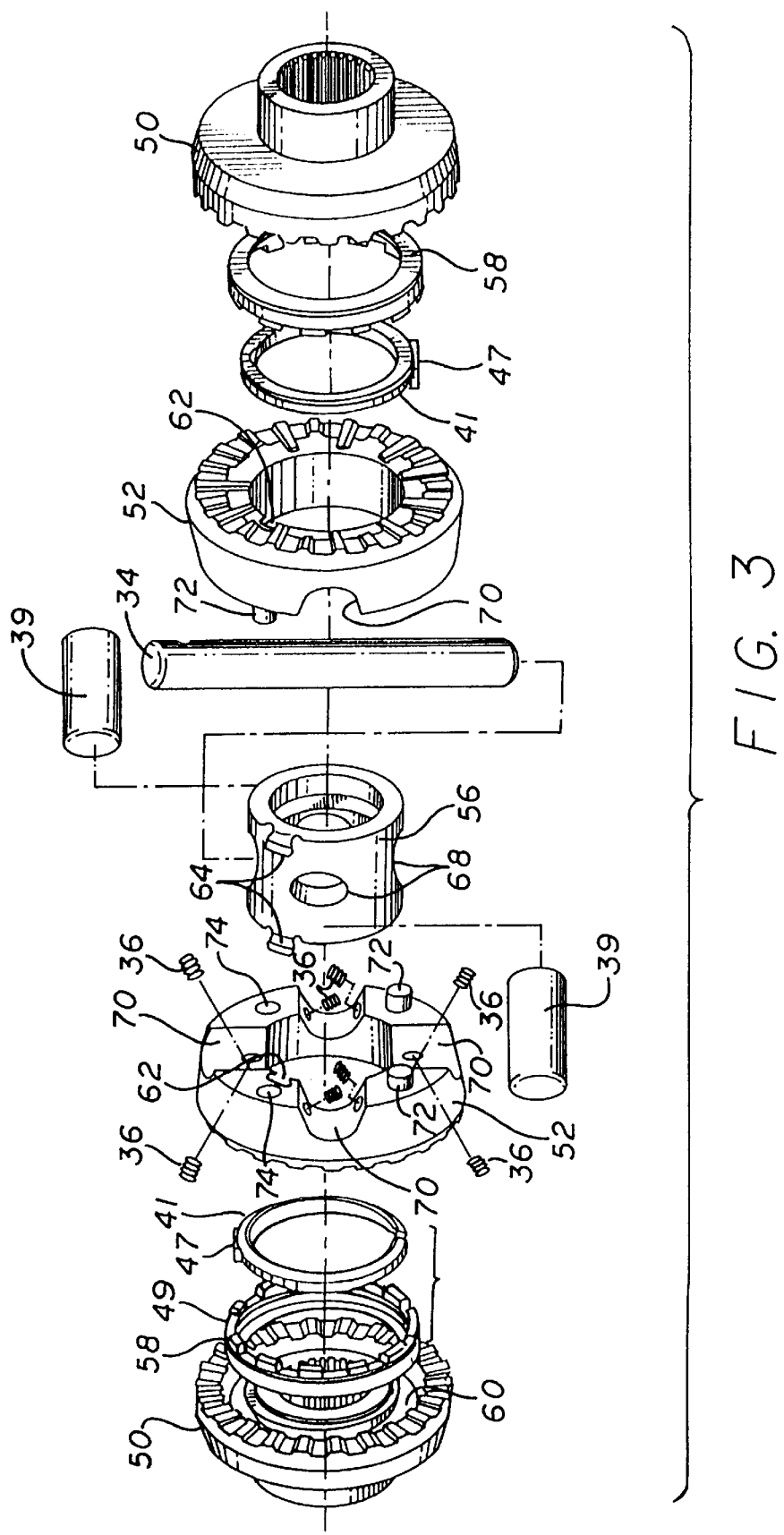
FIG. 3 is an exploded perspective view of the differential of FIG. 2 illustrating the various parts of one embodiment of the present invention.

As shown in FIG. 3, in addition to couplers 50 and drivers 52, the preferred embodiment of the present invention includes a spacer 56, and synchro rings 58. Synchro rings 58 (ring-like structures) each fit within a relief 60 in the face of the respective coupler 50. As may be seen in FIGS. 3 and 4, each relief 60 of this embodiment has a cylindrical outer diameter within which the synchro ring 58 slides, with the inner surface 43 of the relief being angled or tapered to form a conical section. In one embodiment (not shown), each synchro ring is a split ring-like structure of a cooperative cross section and diameter to allow elastically changing its diameter for assembly purposes, with the synchro ring elastically closing so as to elastically frictionally grip the conical tapered inner surface 43 to provide the desired rotational drag with respect thereto, and to encourage the synchro ring into sliding frictional engagement with the back wall of the relief 60 for positive longitudinal location thereof. In this embodiment, the tolerance for the radial position of projections on the periphery of the synchro ring is increased because the assembled diameter of the synchro ring is dependent on the diameter of the conical tapered inner surface 43.

Figure 4:
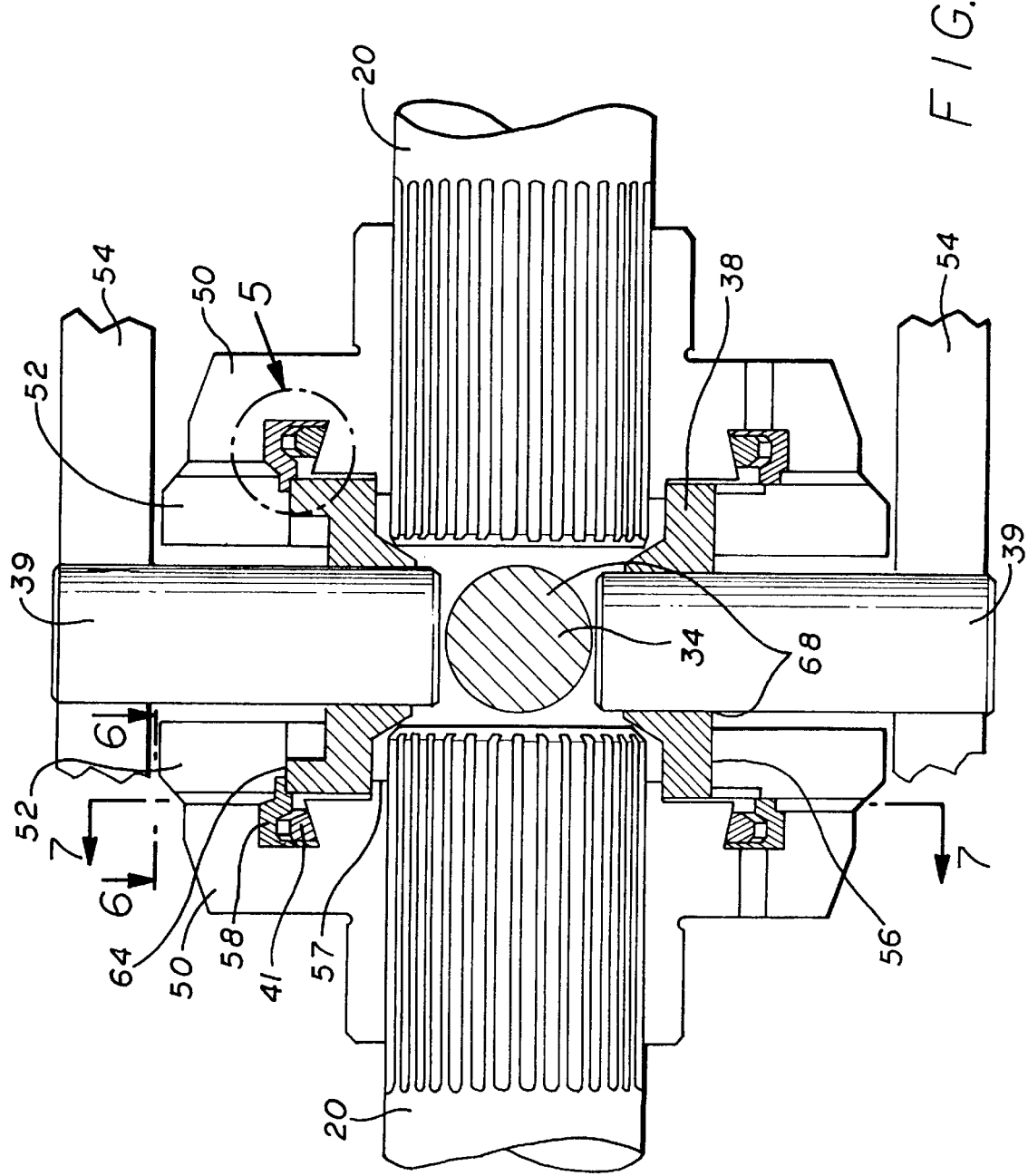
FIG. 4 is a partial cross section of the positive acting differential of FIG. 2.

In the embodiment shown in FIGS. 3, 4, and more particularly in FIGS. 5a through 5f, each synchro ring 58 is a solid piece that closely fits against the back and the outer diameter of the relief 60. A restraining member holds the synchro ring 58 in the relief 60 so that the synchro ring may be forcibly rotated within the relief. The restraining member can be any form of mechanical restraint that holds the synchro ring firmly against the back of the relief.

An exemplary embodiment of a restraining member is a drag clip 41 as shown in FIGS. 3 and 5a–g. Each drag clip 41 is a split ring-like structure of a cooperative cross section and diameter to allow elastically changing its diameter for assembly purposes, with the drag clip elastically closing so as to elastically frictionally grip the conical tapered inner surface 43 to provide the desired rotational drag with respect thereto, and to encourage the respective synchro ring into sliding frictional engagement with the back wall of the respective relief 60 for positive longitudinal location thereof. Each drag clip may be rotationally confined with respect to the respective synchro ring so that the two effectively rotate in unison as shown. In an alternate embodiment (not shown) the drag clip may be rotationally independent of the synchro ring and may or may not rotate relative to the coupler.

Figures 5F, 5G:
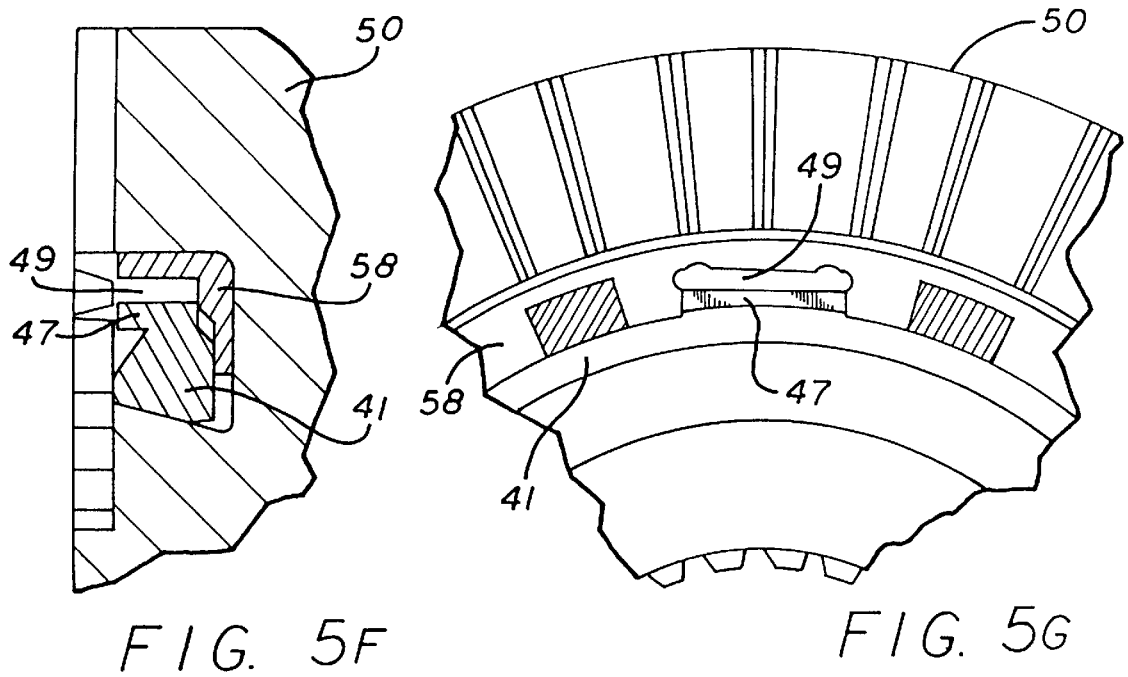

Referring now more specifically to FIGS. 5a through 5g, and more particularly starting with FIG. 5a, the exemplary embodiment uses a drag clip having an outer diameter, when undeflected, which is smaller than the diameter of the annular surface 45 of the synchro ring 58 so that the drag clip will slip into the recess in the synchro ring. Once inserted, the drag clip 41 is elastically opened to a larger diameter as shown in FIG. 5b, and the assembly of the synchro ring and drag clip is inserted into the relief 60 in the coupler, as shown in FIGS. 5b and 5c. In practice, once the leading edge of the inner diameter of the drag clip clears the leading edge of the conical tapered inner surface 43 of the relief 60, the drag clip may be released and rotated to allow the drag clip to seek the position shown in FIG. 5d.

FIGS. 5e, 5f and 5g illustrate the provision to angularly confine the synchro ring 58 with respect to the drag clip 41.

In particular, the cross sections of FIGS. 5e and 5f and the face view of FIG. 5g illustrate the area of the synchro ring and drag clip wherein the drag clip has a projection 47 fitting within a relief 49 in the synchro ring. There is very little circumferential clearance between the two parts, but there is sufficient radial clearance to allow relative radial motion as required for assembly purposes. The drag clip 41 causes the synchro ring 58 to rotate with the coupler 50 unless restrained, whereupon the drag clip frictionally slides on the tapered surface of the relief 60 of the respective coupler.

As may be seen in FIG. 3, the spacer 56 has a paddle 64 projecting radially at each of the axially opposed ends. Each paddle fits into a specific location in the adjacent synchro ring 58. In the preferred embodiment, the paddle 64 is received in the relief 49 that also receives the projection 47 on the drag clip 41. In the preferred embodiment described herein, the width of the paddle 64 is smaller than the relief 49 within the synchro ring 58 in such a manner as to allow a 10° total rotation of the synchro ring 58 relative to the spacer 56. Thus, within that given freedom, each synchro ring 58 will rotate in unison with the respective coupler 50, though the synchro ring will be restrained by the paddle 64 when contacting the same and will no longer rotate with the respective coupler should the coupler continue to rotate beyond that specified freedom.

Figure 15:
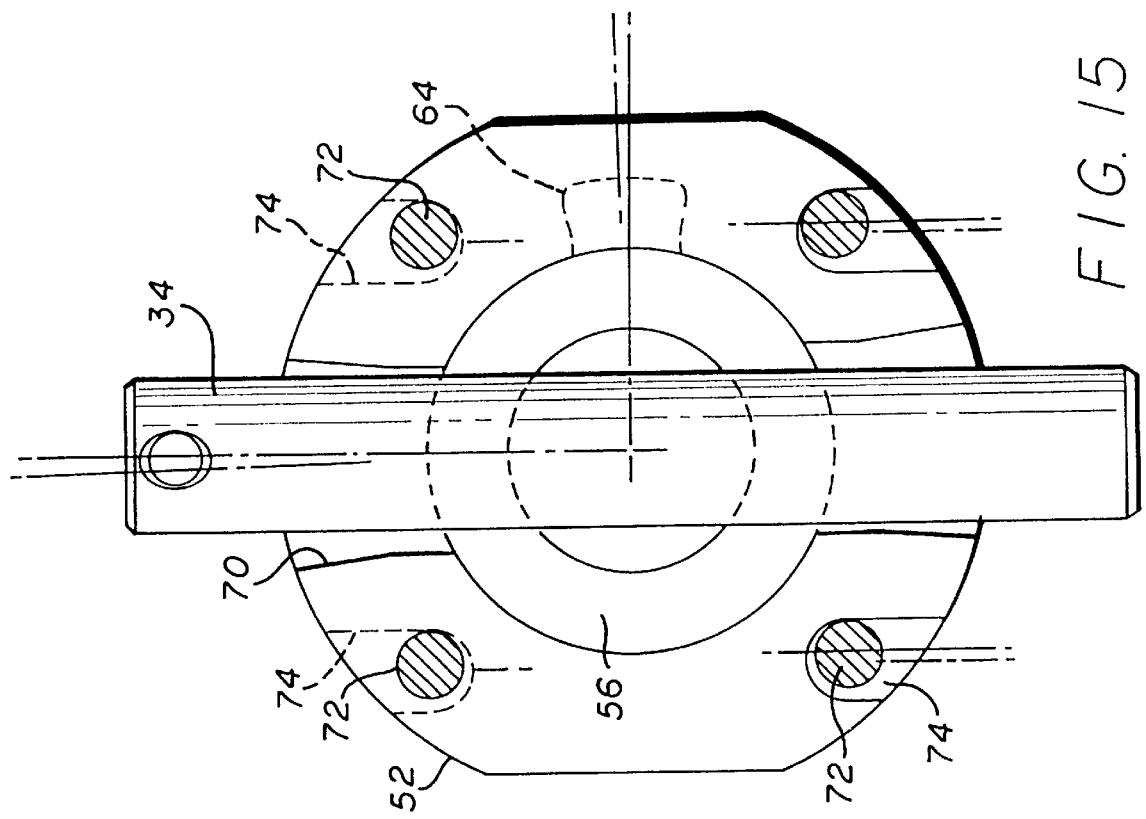
FIG. 15 illustrates the position of the pins 72 in holes 74 when one driver is advanced relative to the other driver and remains with pins 34, 39 engaged with the side of the saddle-shaped depression of one driver.
Figure 14:
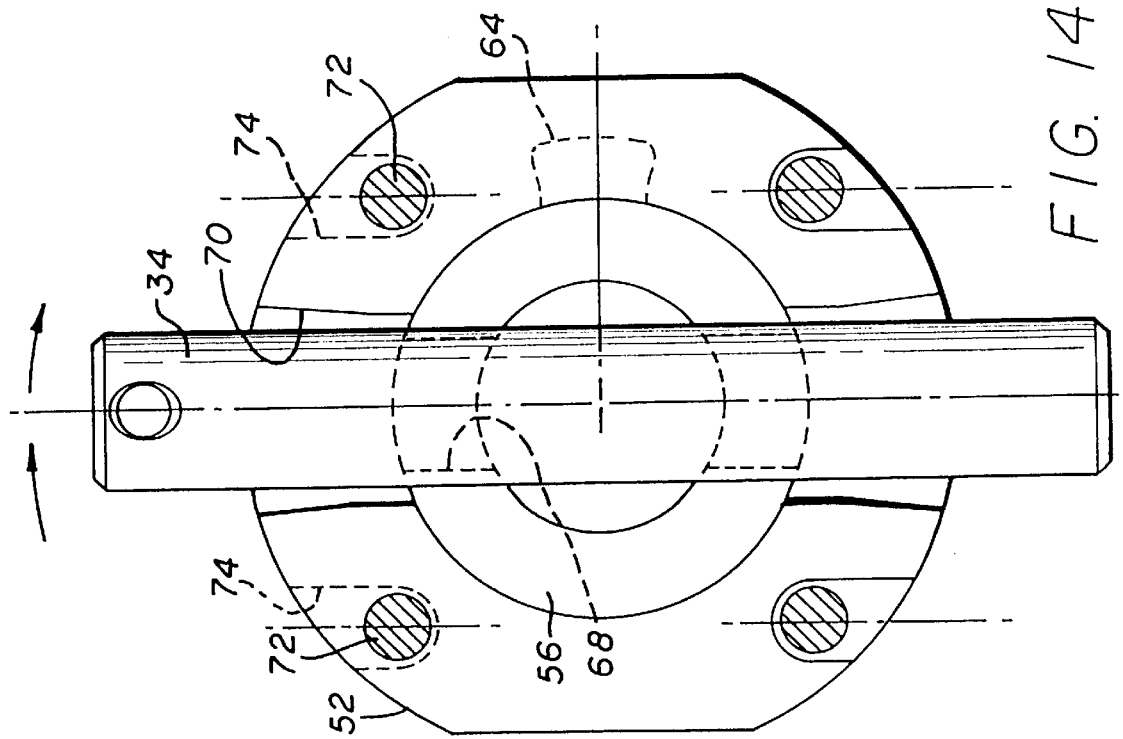
FIG. 14 illustrates the position of the pins 72 in holes 74 when the drivers are in alignment. It also shows the saddle-shaped depressions 70 of the two drivers centered with respect to pinion pins 34, 39.

In the assembled differential, the spacer 56 is supported at each end by bosses 57 on the faces of the couplers 50, as may be seen in FIG. 4. The ends of the spacer are in close proximity to the faces of the couplers so that the paddles 64 fit within the gap in the synchro rings 58. It should be noted that the paddles are preferably located at an angle relative to the pinion pins as shown in FIG. 3. FIG. 4 shows the paddle and the pinion pins as aligned to more clearly show the axial space relationships although this is not the preferred angular relationship. The spacer 56 is retained in its final position by the insertion of pins 34, 39 through the differential case 54 and the closely fitted holes 68 in the spacer 56. Thus, the spacer 56 in the final assembly has no intentional rotational freedom about the axis of the assembly relative to pins 34, 39, but rather in essence rotates in unison with the pins. This is to be compared with the drivers 52, which as with the prior art locking differential herein before described, have a total rotational freedom about the axis of the assembly with respect to pins 34, 39 of approximately 5° because of the loose fit of the saddle-shaped depressions 70 on the drivers. Similarly, the drivers 52 have a relative rotation capability, one to the other, of approximately 1.5°, determined by the fit of pins 72 and holes 74 in the drivers. This is illustrated in FIGS. 14 and 15, wherein FIG. 14 illustrates the position of the pins 72 in holes 74 when the drivers are in alignment and having their saddle-shaped depressions 70 centered with respect to pins 34, 39 of the two drivers 52, and FIG. 15 illustrates the position of the pins 72 in holes 74 when pins 34, 39 are engaging the sides of the saddle-shaped depressions on one driver and the other driver is advanced with respect to the pinion pins 34, 39.

Finally, as may be seen in FIGS. 7 to 13, certain teeth 78 on the face of drivers 52 extend to a diameter different than the teeth 51 (FIG. 3) on the couplers 50, and the remaining teeth 53 on the drivers 52. Protrusions are formed by these extended teeth 78 that are intended to work with slots 76 in the synchro ring 58. (A circular pattern of protrusions could be formed separate from the teeth and be just as functional, however, perhaps not as efficient to produce as the extended teeth.) These protrusions have the same spacing as the slots 76 in the synchro rings 58 and in the embodiment presented, will fit within slots 76 with a total angular freedom between a driver 52 and a synchro ring 58 of approximately 9.6 degrees. This opening can range however, from a minimum equal to half of the saddle backlash to a maximum equal to the angle between driver teeth plus half of the saddle backlash.

Figure 7:
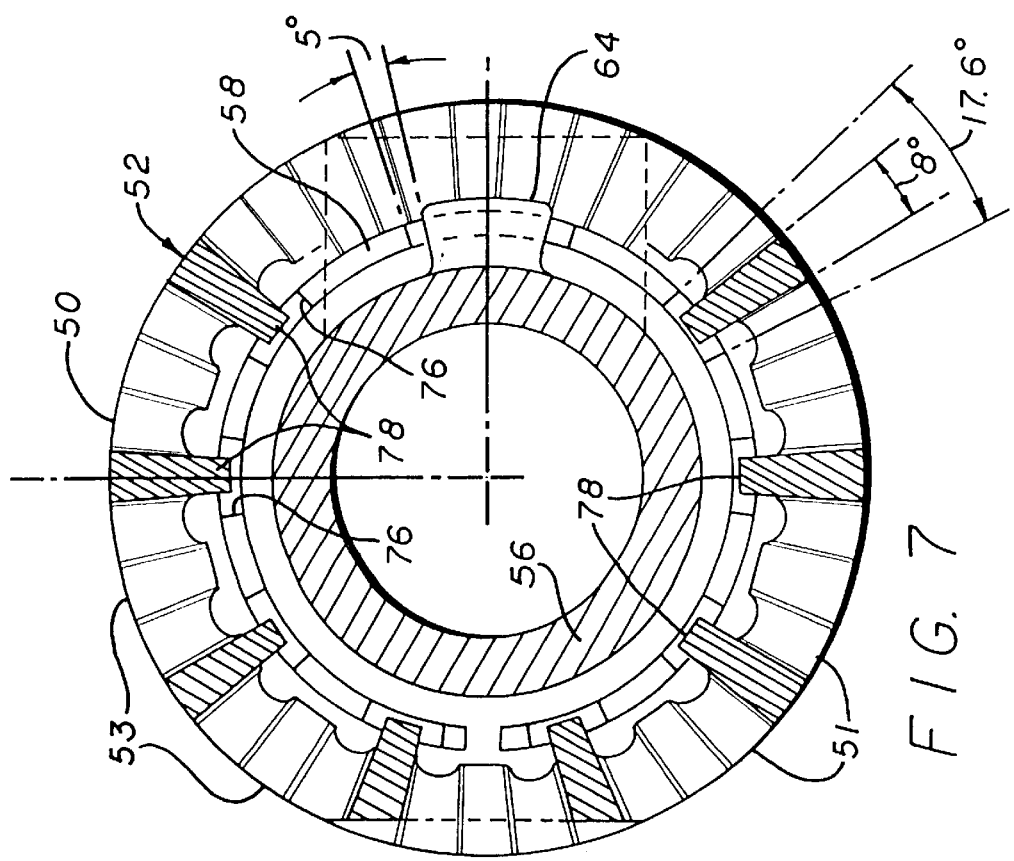
FIG. 7 is a cross section through the positive acting differential of the present invention taken along the line 7—7 of FIG. 4 and showing the parts in a symmetrical positions.

The general relationship just described may be seen in FIG. 7, which is a cross section through the positive acting differential taken along the line 7—7 of FIG. 4, though with only the cross section of the extended teeth of the driver, not all teeth of the driver, being shown so as to make the coupler teeth thereunder viewable in the figure. This allows the relative positions of the driver and the associated coupler to be easily viewed, though a true cross section would show all teeth of the driver in cross section, tending to obscure the relative position of the associated coupler thereunder. A true cross section would also show the groove 62 in the inner bore of the driver as shown in the embodiment of the invention of FIG. 3. This groove is omitted to maintain the clarity of the relationship being illustrated by this figure. In this regard FIG. 7 is suggestive of the cross section of the embodiments illustrated by FIGS. 16 and 17. This illustrative license is continued in FIGS. 8 through 13 for the same ease of visualization purposes.

FIG. 7 illustrates the fitting of the paddle 64 in the gap of the synchro ring 58, as well as the fitting of the protrusions formed by the extended teeth 78 of the drivers 52 into the slots 76 in the synchro rings 58. In FIG. 7, all parts are angularly centered with respect to each other, the paddle 64 being centered in the gap in the synchro ring 58, the extended teeth 78 being centered in the slots in the synchro ring 58, and, since the spacer 56 is rotationally locked with respect to pins 34, 39 (FIG. 3), the drivers 52 are necessarily positioned with their saddle-shaped depressions 70 centered with respect to pins 34, 39.

As with the prior art, when the pins 34, 39 engage the saddle-shaped depressions 70 on either driver, the force of the contact, by design of the saddles, will be angled outward from the plane of the respective driver. The preferred embodiment in which the present invention is used includes a departure from the prior art related to the design of the saddle by including the displacement of the synchro ring. Previous saddle designs use pin and hole geometry that centers the disconnecting driver saddle on the drive pins and generate a helical surface running from a cutter depth equal to the radius of the pins out beyond the top surface of the driver. The depth of the saddle is held equal to the pin radius and the thickness of the driver is such that when the driver is disconnected, the inner surface of the driver does not pass the centerline of the pins. These features facilitate manufacturing, but do not optimize backlash.

The present embodiment uses saddle geometry that optimizes backlash while creating conditions for correct positioning of the synchro ring. Backlash is optimized by recognizing that the driver needs to displace an amount only slightly greater than the height of the teeth multiplied by the tangent of the maximum saddle angle. The result is much less than half the saddle travel as used in previous designs. This minimum displacement is further modified by adding an amount to achieve a desired displacement of the pins and effect removal of the overlap of the synchro ring with the protruding teeth of the driver when the vehicle changes from driving to coasting. This amount is determined by examining the free travel of the pins from contact with the near-side of the connected driver saddle to contact with the far-side of the disconnected driver saddle. This travel must be such that by virtue of the pins carrying the spacer whose paddle moves the synchro ring, the synchro ring is moved to allow the teeth of the driver and coupler to mesh when synchronized. Once meshed, the teeth can then transmit torque, both driving and coasting/braking.

Figures 6A, 6B:
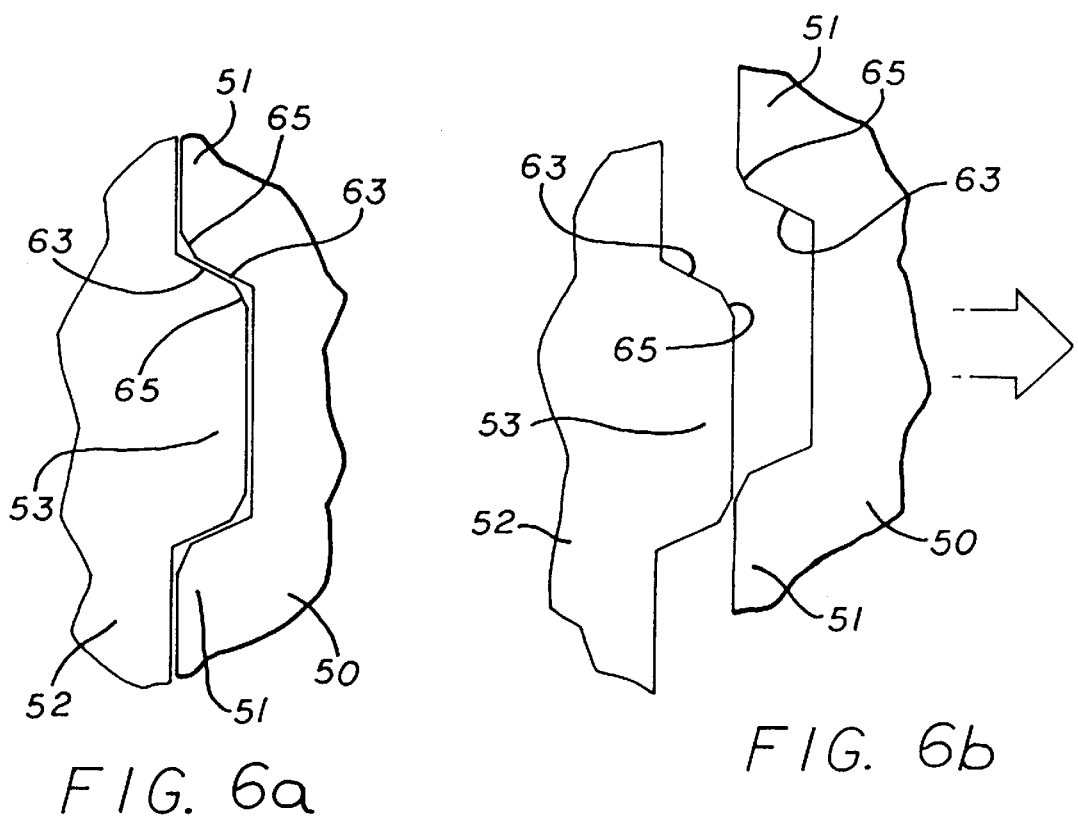
FIGS. 6a and 6b are illustrations of the chamfered tooth profile of the chamfered teeth on the drivers and the couplers when in different relative positions, as viewed along lines 6—6 of FIG. 4.

The edges on the mating teeth on the drivers 52 and couplers 50 are not square. Instead, the mating teeth are inclined in the base regions 63 thereof (see FIGS. 6a and 6b) at an angle less than that of the saddle, and the outer regions of the teeth are chamfered at an angle substantially exceeding the saddle angle. (The chamfer does not extend to the extended part of the teeth (see FIG. 3b) but rather the extended part of the teeth maintains a rectangular cross section.) Consequently when the teeth on the drivers and couplers are near or in full engagement and the pins 34, 39 are forcibly engaged with the drivers, the net outward force on the drivers keeps the teeth on the drivers from climbing the sides of the teeth on the couplers, but allows the climbing of the teeth when pins 34, 39 are not forcibly engaged with the respective driver. However, when the teeth on the drivers and couplers are only in slight engagement on chamfered regions 65 and the pins 34, 39 are forcibly engaging the respective driver, the net force on the respective driver is inward toward the pins 34, 39, allowing the climbing of the teeth in spite of the pins 34, 39 being forcibly engaged with the respective driver. It can be shown that for typical dimensions used for the tooth height and driver and coupler diameters, the total rotation of a driver relative to the respective coupler from the beginning of driver teeth climbing on the coupler teeth to the point where climbing is complete and the top of the driver teeth will begin to slide over the top of the coupler teeth is approximately 0.75°.

In the embodiment described above, the chamfer does not extend to the extended part of the extended teeth 78 but rather the extended parts of the teeth maintain a rectangular cross section (see FIG. 10a). It is possible to obtain the effects described even when the chamfer is provided on the teeth of only the drivers 52 or only the couplers 50. This embodiment simplifies fabrication of the driver 52 because it eliminates the requirement for a chamfer along only a portion of the extended teeth 78.

The angular motion limits and tooth angles for the embodiment described herein may be summarized as follows:

| Parts | Angular motion limits |
|---|---|
| Driver to pinion pins | 2.5° |
| Driver to driver | 1.5° |
| Paddle to pinion pins | ~0° |
| Paddle to ring | 5° |
| Ring to extended tooth on the driver | 4.8° |
| Driver to coupler tooth climbing - start to finish | ~0.75° |
| Driver and coupler tooth angle base of teeth (from line parallel to axles) | Approx 23° |
| Driver and coupler tooth angle outer region of teeth (from line parallel to axles) | Approx 65° |
| percent of tooth length in base region | Approx 80% |
| Pinion pin to driver engagement angle (from line parallel to axles) | Approx 35° |

FIG. 7 represents an arbitrary starting point for the description of the operation of the present invention. It represents a good point to start the description, as it illustrates the general symmetry of the structure and thus the similarity in the operation of the various parts while the vehicle is powering forward, powering in reverse, using the engine to retard forward motion or using the engine to retard rearward motion.

Figure 8:
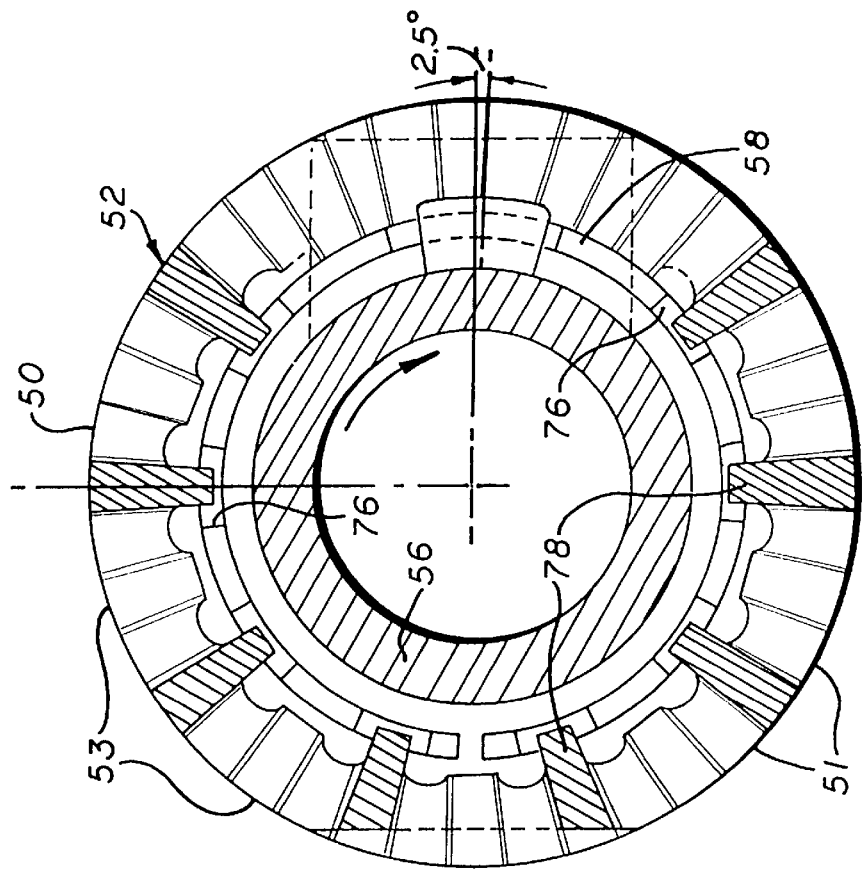
FIG. 8 is a view similar to FIG. 7, illustrating the relative part positions as the ring gear 80 (FIG. 2) begins to rotate.

Starting from the condition of FIG. 7, as the ring gear 80 (FIG. 2) begins to rotate, the pinion pins 34, 39 (FIGS. 2 and 3) initially rotate spacer 56 and paddle 64 2.5 degrees, as shown in FIG. 8. In that regard, it is to be remembered that spacer 56 is essentially coupled to the pins 34, 39 (FIGS. 2 and 3) so as to rotate with the pins and thus with the ring gear. Also, the frame of reference for this Figure as well as FIGS. 8 through 13 is the driver, and accordingly, all of the foregoing Figures have the extended driver teeth shown in cross section in the same position, with the other parts of the assembly moving as appropriate to illustrate the relative positions of the parts during various phases of operation hereafter described.

When the spacer 56 has rotated 2.5 degrees as in FIG. 8, paddle 64 approaches one end of the opening within synchro ring 58. At the same time, the pins 34, 39 (FIGS. 2 and 3) are forced against the saddle-shaped depression 70 in the driver so that no further clockwise rotation of the paddle with respect to the driver 52 may occur. Under this condition, the pins 34, 39 pushing against the edge of the saddle-shaped depression in the driver force the driver into engagement with the teeth of the coupler 50 to provide a positive drive for the respective axle of the vehicle.

Figure 9:
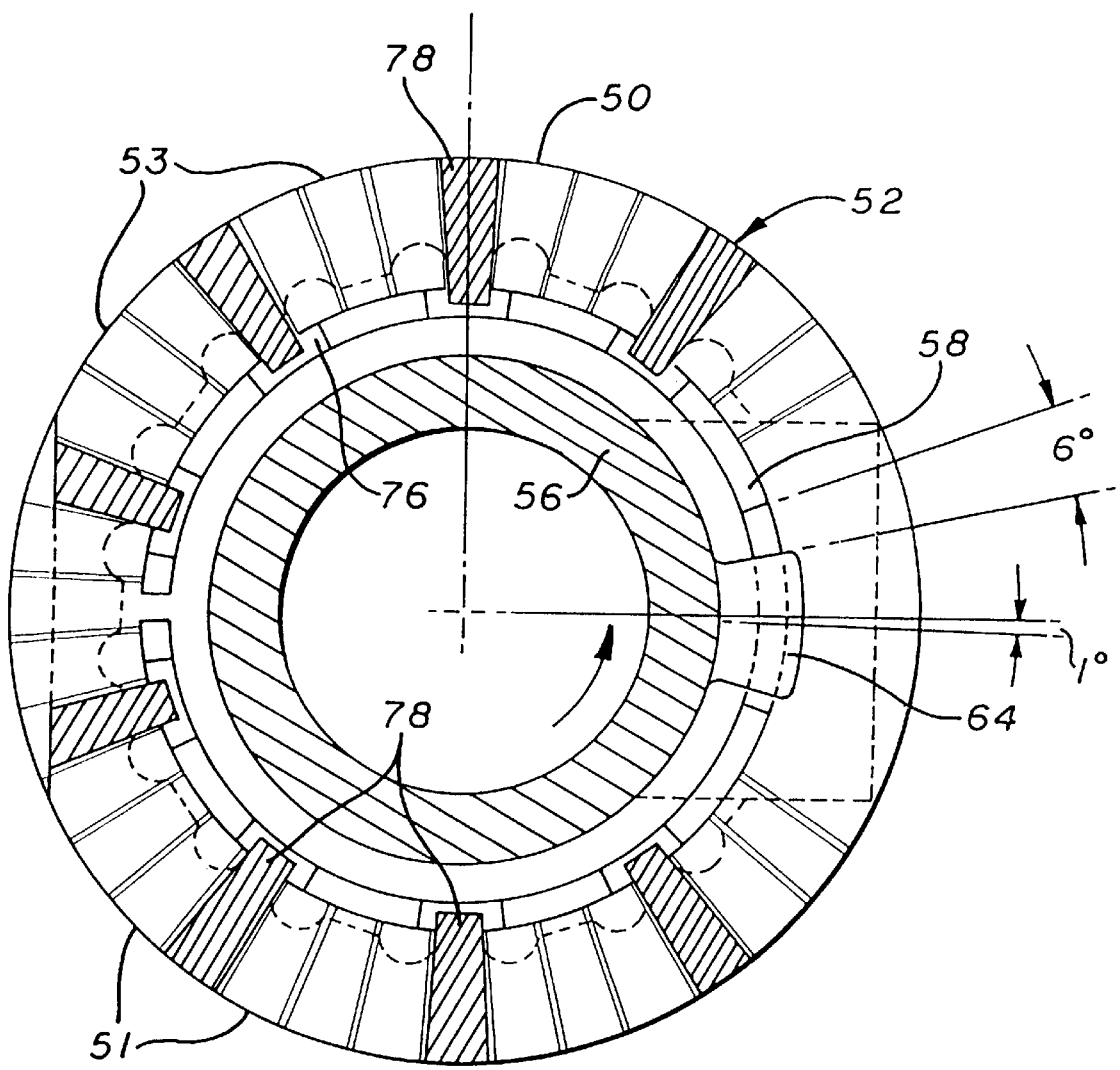
FIG. 9 is a view similar to FIG. 8, illustrating the relative part positions when the wheel for the assembly being illustrated begins to rotate slightly faster than the opposite wheel, as when the vehicle begins to be powered around a curve.

Assuming both axles of the vehicle are being driven, FIG. 9 illustrates what happens when the wheel for the assembly being illustrated begins to rotate slightly faster than the opposite wheel, as when the vehicle begins to be powered around a curve. Specifically, spacer 56 rotates to the relative position with respect to driver 52 shown in FIG. 9, the coupler 50 forcing the driver to a position advanced with respect to pins 34, 39. However, assuming the other axle is still being driven, the driver 52 for the wheel turning faster will reach the limit of its rotational capability with respect to the opposite driver of 1.5 degrees because of the engagement of the pins 72 and the holes 74. Accordingly, as the coupler being illustrated continues to rotate faster than the coupler for the wheel still being driven, the teeth on the driver 52 begin to climb the teeth on the coupler 50, as illustrated in FIG. 6. (See also FIGS. 11a and 11b.) As the coupler rotates in the direction of the arrow shown therein, the total relative angular rotation between the coupler and driver for the driver teeth to fully climb the teeth on the coupler (FIG. 10) is on the order of 1 degree or less, in the exemplary embodiment being approximately 0.75 degrees. This brings the synchro ring 58 to within approximately 5.25 degrees of the paddle 64 and the extended teeth 78 within approximately 4.0 degrees of the edge of the slots in the synchro ring 58. This is shown in FIGS. 10a and 10b, illustrating the extended teeth 78 and the driver 52 relative to the slot in the synchro ring 58 before the climbing of the teeth on the coupler 50 begins, and again just after climbing has been completed.

Of particular importance is the relative location of the parts after such climbing has been completed. In particular, the top of the teeth on the driver 52 are now free to slide across the top of the teeth on coupler 50. Further, the top of synchro ring 58 is slightly spaced from the top of the teeth on the driver 52, something in the order of a few thousandths of an inch. Thus, while there is still a slight separation between the extended tooth 78 and the edge of a slot in synchro ring 58, the synchro ring 58 is in fact free to move to a position slightly under the top of the extended tooth 78. In the preferred embodiment this engagement is on the order of 0.020 to 0.060 inches.

Figure 11A:
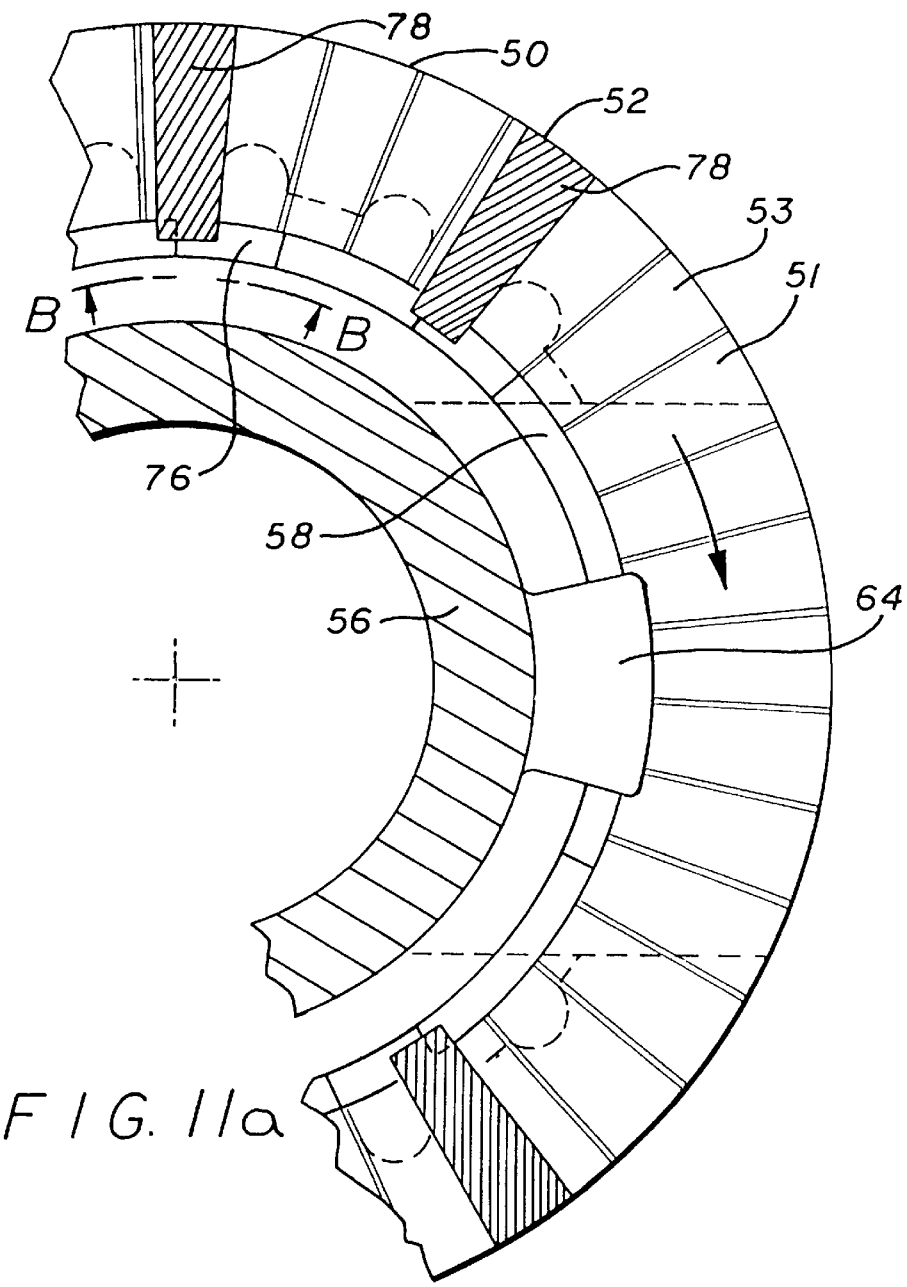
FIGS. 11a and 11b illustrate the relative part positions as the coupler being illustrated continues to rotate relative to the driver from the position shown in FIG. 10.
Figure 11B:
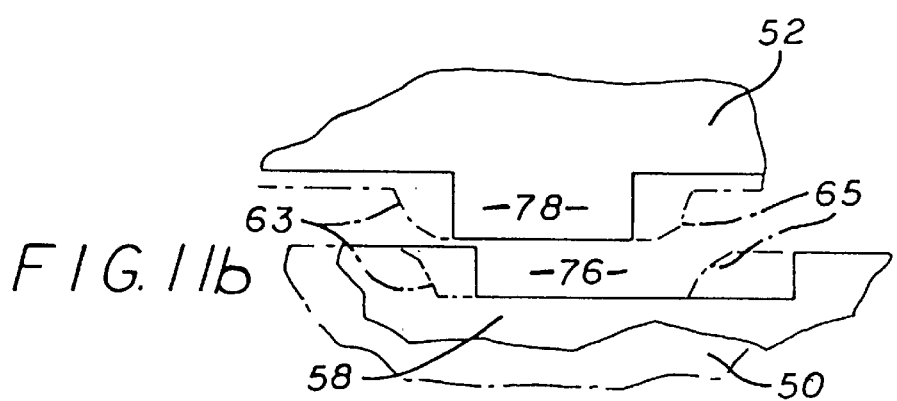

As the coupler 50 continues to rotate relative to the driver, synchro ring 58 will continue to rotate with the coupler 50 another 5.25 degrees before contacting paddle 64. This will bring synchro ring 58 under the extended teeth on driver 52, as shown in FIG. 11a , and more clearly in FIG. 11b. Because the spacer 56 is essentially locked to the pins 34, 39 (FIG. 3) and driver 52 is limited against further motion by pins 72 and holes 74 between the two drivers (see FIG. 3), the driver 52 and the spacer 56 will remain in the position shown in FIG. 11, as will the synchro ring 58, the synchro ring slipping on the coupler as the coupler continues to rotate in the direction shown. On continued rotation of the coupler in the same direction, each time the coupler teeth come into alignment for potential engagement with the driver teeth, the synchro ring 58 will hold the extended teeth in the driver to prevent significant engagement with the coupler, more particularly only slight engagement by the chamfers on the teeth. This eliminates the noise of the repeated engaging and disengaging of the freewheeling driver and coupler experienced in the prior art. Of particular importance to achieve this is the fact that the synchro ring surface adjacent the edge of each of slots 76 therein will just barely clear the extended tooth on the driver after the teeth climbing has been completed.

Figure 12:
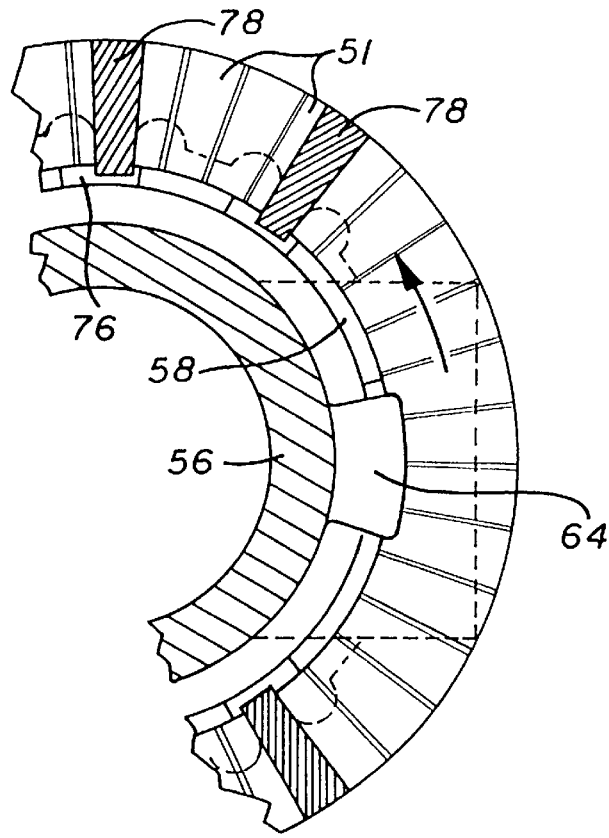
FIG. 12 illustrates the relative part positions as the coupler 50 begins to rotate in the counter-clockwise direction with respect to the driver 52.
Figure 13:
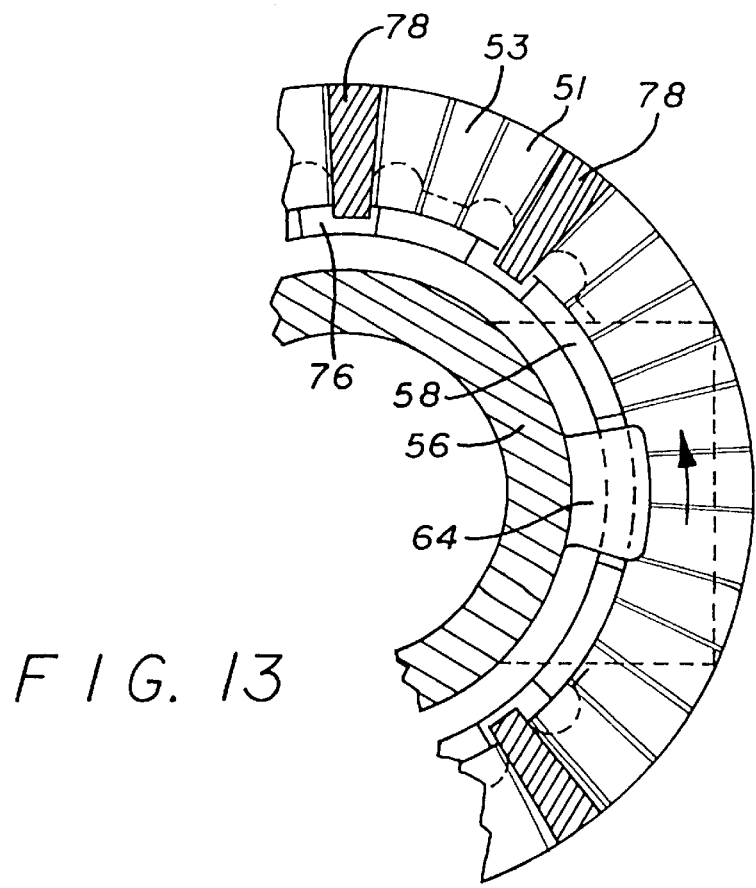
FIG. 13 illustrates the relative part positions after the teeth on the coupler and driver re-engage.

Now assume that the vehicle, still being powered, comes out of the first curve and enters a curve in the opposite direction. In this case because of the change in relative speed, the coupler 50 begins to rotate in the counter-clockwise direction with respect to the driver 52, as illustrated in FIG. 12, initially taking synchro ring 58 therewith. In the first part of the rotation, the extended teeth on driver 52 will align with the slots 76 in the synchro ring 58. When, in this condition, the teeth on the coupler and driver align for engagement, the springs 36 (FIG. 3) force the driver teeth into engagement with the coupler teeth after which time pins 34, 39 will rotate to engage the saddle-shaped depressions 70 in driver 52 to begin driving that axle, now the more slowly rotating axle. The final position of the components of the driving wheel is illustrated in FIG. 13.

When returning to driving straight after a turn, the position of the parts relative to each other will depend upon whether, and to what extent, the driver teeth aligned with the coupler teeth for engagement. Ultimately due to variations in terrain and slight course corrections along a straight path, the previously disengaged driver will become reengaged and transfer power from the pins to coupler or vice versa. In any event, because of the general symmetry of the parts, the operation will be as described, whether powering forward or in reverse around a curve, or using the engine for braking forward motion or rearward motion while going around the curve. Also, of course, when the wheel associated with the driver and coupler which are engaged at any given time begins to slip, the opposite driver and coupler, if not already engaged, will immediately engage, thereby providing the desired torque transferring differential action.

The chamfering of the teeth on the couplers 50 or drivers 52 or both provides a number of advantageous results, whether used in prior art locking differentials or as disclosed with respect to the preferred embodiment, the quiet positive acting differential described. In particular, as described herein, the angle of the root portion of the engagable teeth on the drivers 52 and couplers 50, as seen in FIG. 6, is chosen so that when a coupler is being driven by the pinion pins 34, 39, the tendency for the teeth 53, 78 on the driver 52 to climb the teeth 51 on the coupler 50 is more than overcome by the force along the axis of the axles between the pins 34, 39 and the respective driver 52, forcing the driver teeth 53, 78 to remain firmly engaged with the teeth 51 on the adjacent coupler 50. The angle of the chamfers, however, has just the opposite effect, namely, if only the outer region of the teeth on a driver and associated coupler are engaged, then even if pinion pins 34, 39 are engaging the respective driver 52 and forcing the driver teeth 53, 78 into further rotation with respect to the coupler teeth 51, the angle of the chamfers will overcome whatever axial force is provided on the driver 52 by the pinion pins 34, 39, forcing the driver back toward the pinion pins as the chamfered portion of the driver teeth 53, 78 easily climb the chamfered portion of the coupler teeth 51, ultimately allowing the tips of the driver teeth to slide over the tips of the coupler teeth. These effects are also obtained when only the driver teeth 53, 78 or only the coupler teeth 51 are chamfered, as previously discussed.

As described, particularly with respect to FIG. 5, the synchro ring 58 and the relief 60 in the coupler have an angled or conical engaging surface to positively axially locate the synchro rings 58 with respect to the couplers. Still, with respect to the operation of the differential described, the protrusions on a synchro ring generally only move under the extended teeth on the drivers when the tops of the teeth on the drivers begin to slide over the tops of the teeth on the couplers. Because of the accumulation of tolerances, the synchro rings may allow the respective drivers to move axially a very few thousandths of an inch into reengagement with the respective coupler teeth when the teeth on the drivers and couplers begin to realign. This, however, can easily be limited to within the axial range of motion for slight chamfer engagement only, causing the coupler to continue to rotate with respect to the respective driver with little axial motion of the driver as the teeth alternately very slightly engage and slide over each other until the pinion pins 34, 39 again begin to drive the respective driver 52 in the opposite direction, forcing the teeth on the driver into firm driving engagement with the teeth on the coupler when the same realign, as previously described. Thus, in the quiet positive acting differential described, the chamfered teeth not only further quiet the operation, but also prevent the inadvertent driving engagement of the mere tips of the teeth on the drivers and the couplers, thereby eliminating the possible over stressing of the teeth tips and the associated wear and deterioration, and noise associated therewith.

Thus in both the differential described herein and prior art locking differentials such as that illustrated in FIG. 1, the chamfered teeth provide the desirable effect of avoiding any possible driving engagement of tooth tips only, which could otherwise overstress the tooth tip area of both the drivers and couplers, resulting in accelerated wear or even local failure of the teeth tips. Such partial driving engagement of the teeth, followed by the teeth becoming disengaged as the drive force is increased, provides a shock to the entire drive train, and a most distracting noise to the vehicle driver. The chamfers, however, substantially eliminate this effect and assure that the teeth engage, for driving purposes at least, only on the lower portion of the teeth, where the teeth are thicker and have no unsupported adjacent outer edge.

The spacer 56 is conveniently made as a single piece with integral paddles 64 as shown in FIG. 3. In this embodiment, grooves 62 must be provided on the inner bore of the drivers 52 to allow the drivers to slide over one of the paddles so the drivers can be assembled onto the spacer.

Figure 16:
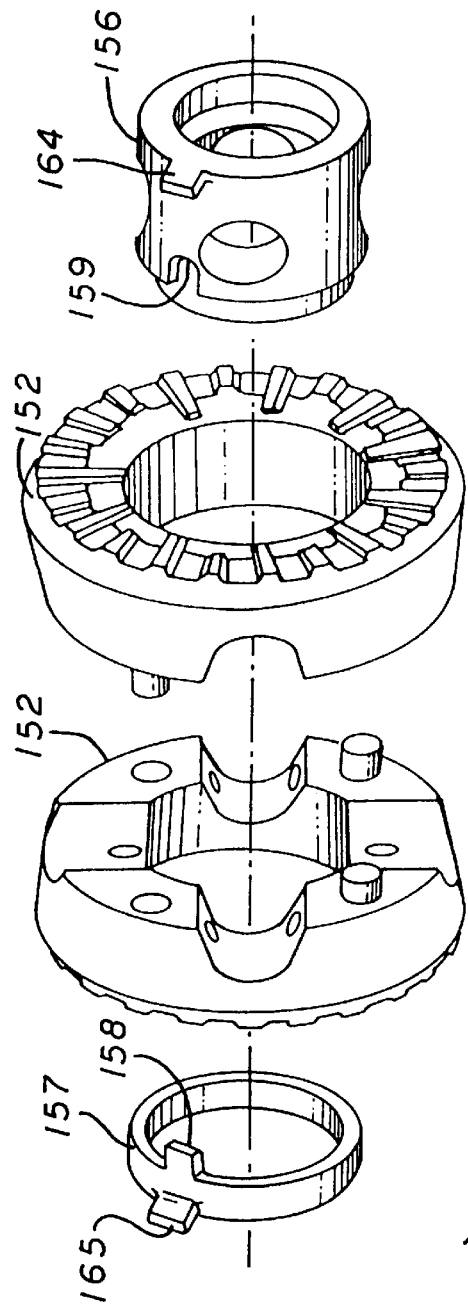
FIG. 16 illustrates an alternate embodiment of the spacer of the present invention.

In an alternate embodiment shown in FIG. 16, the spacer is a two piece assembly. The main body of the spacer 156 includes an integral paddle 164 on one end. The main body and the drivers 152 can be assembled without the need for a groove in the bore of the drivers. The second paddle 165 is integral with a paddle ring 157 that is coupled to the main body by a tab 158 and mating slot 159.

Figure 17:
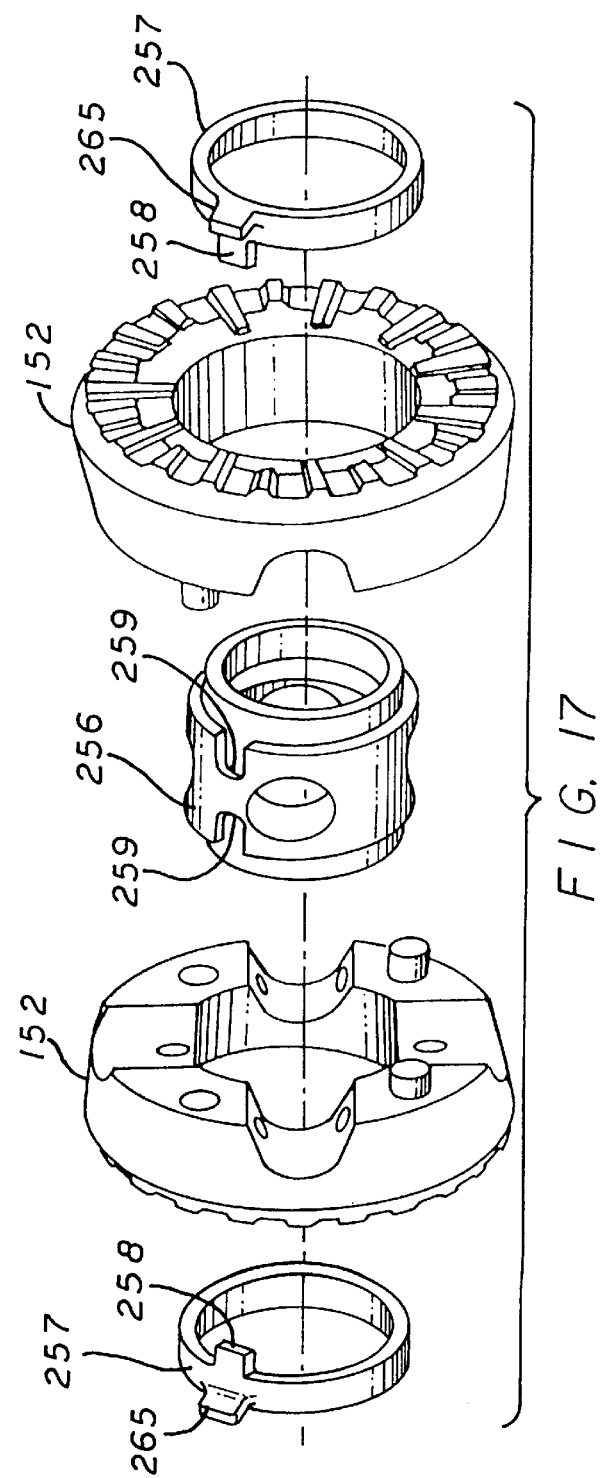
FIG. 17 illustrates another alternate embodiment of the spacer of the present invention.

Another embodiment is shown in FIG. 17. This spacer is a three piece assembly. Both paddles 265 are integral with paddle rings 257. The two paddle rings are coupled to opposing ends of the main body by tabs 258 and mating slots 259. The main body and the drivers 152 can be assembled without the need for a groove in the bore of the drivers. The three piece assembly allows the main body to be fabricated from tube stock with minimum waste. It will be appreciated that in this and the preceding embodiment, the tab and slot relationship could be reversed with the tab on the main body. Other methods could also be used to provide a positively engaged assembly of the paddle ring to the main spacer body, as will be apparent to those skilled in the art.

There has been disclosed and described herein new and unique positive acting differentials which provide all of the desired features of a locking differential while at the same time eliminating a distracting sound and adverse cycling characteristic associated with the prior art differentials discussed. While the invention has been disclosed and described with respect to certain preferred embodiments thereof, it will be understood by those skilled in the art that various changes in form and detail may be made therein without departing from the spirit and scope of the invention.

What is claimed:

1. A positive acting differential comprising:
   a first and a second coupler coaxial along an axis;
   a spacer coaxial along the axis and between the couplers;
   a first and a second paddle projecting radially from the axis, each of said paddles being coupled to the spacer at axially opposing ends;
   a primary pinion pin substantially perpendicular to the axis and coupled to the spacer;
   a secondary pinion pin substantially perpendicular to the axis, coplanar with the primary pinion pin, and coupled to the spacer;
   a first and a second driver coaxial with the axis, between the pinion pins and the respective coupler, and supported by the spacer such that each driver is separately moveable along the axis;
   the first and the second coupler and the first and the second driver each having a toothed face with cooperatively disposed axially engagable teeth;
   the first and the second coupler each having an annular groove on the toothed face of the coupler;
   a first and a second ring structure, each of said ring structures located in the annular groove of one the first and second couplers in a forcibly rotatable position relative to the respective coupler; and
   each of said ring structures engaging the adjacent paddle and being forcibly rotatable relative to the respective coupler by the engaged paddle to a first or a second extreme position relative to the pinion pins after the teeth on the respective driver have climbed the teeth on the respective coupler, the ring structure preventing substantial re-engagement of the teeth on the respective driver and coupler when in one of the first and the second extreme position, and allowing engagement of the teeth on the respective driver and coupler when the ring structure is not near either the first or the second extreme position.

2. The positive acting differential of claim 1 wherein for assembly purposes, each driver has an inner bore to receive the spacer, said inner bore having an axial groove to permit the paddle on one end of the spacer to pass through the inner bore.

3. The positive acting differential of claim 1 wherein for assembly purposes, at least one paddle can be coupled to the spacer after the first and the second driver are assembled to the spacer.

4. The positive acting differential of claim 1 wherein each paddle engages the respective ring structure between projections approximately diametrically opposed to a split in the ring structure.

5. The positive acting differential of claim 1 wherein each paddle engages the respective ring structure on ends of the ring structure facing a split in the ring structure.

6. The positive acting differential of claim 1 wherein each ring structure is further comprised of a synchro ring and a retaining member that holds the synchro ring in the forcibly rotatable position relative to the respective coupler.

7. The positive acting differential of claim 6 wherein the retaining member is a drag clip elastically engaging the annular groove in the respective coupler.

8. The positive acting differential of claim 7 wherein each paddle engages the respective drag clip causing the synchro ring and the drag clip to move substantially in unison.

9. The positive acting differential of claim 6 wherein each synchro ring is coaxial with the axis, and each synchro ring has a plurality of projections facing the respective driver, the respective driver having at least one protrusion extending to contact a respective projection on the synchro ring when the synchro ring is in either of the first and the second extreme positions to prevent substantial re-engagement of the teeth on the respective driver and coupler, and to not contact the respective projection on the synchro ring when the synchro ring is not near either the first or the second extreme position to allow re-engagement of base regions of the teeth on the respective driver and coupler.

10. The positive acting differential of claim 9 wherein the protrusion is an extended tooth and the drivers further comprise a plurality of extended teeth to contact the plurality of respective projections on the respective synchro ring.

11. The positive acting differential of claim 10 wherein tops of the plurality of projections on each synchro ring extend to adjacent but not beyond tops of the plurality of teeth on the respective coupler, and tops of the extended teeth on each driver are substantially coplanar with the rest of the teeth on the driver.

12. A positive acting differential comprising:
    a first and a second axle coaxial along an axle axis; and, within a differential case,
    a first and a second coupler coaxial with the axle axis, each coupler engaging the respective axle;

a spacer coaxial along the axle axis and between the couplers;

a first and a second paddle projecting radially from the axle axis, each of said paddles being coupled to the spacer at axially opposing ends;

a primary pinion pin substantially perpendicular to the axle axis and coupled to the spacer;

a secondary pinion pin substantially perpendicular to the axle axis, coplanar with the primary pinion pin, and coupled to the spacer;

a first and a second driver coaxial with the axle axis and between the pinion pins and the respective coupler;

the first and the second coupler and the first and the second driver each having a toothed face with cooperatively disposed axially engagable teeth;

the first and the second coupler each having an annular groove on the toothed face of the coupler;

a first and a second ring structure, each of said ring structures located in the annular groove of one the first and second couplers in a forcibly rotatable position relative to the respective coupler; and each of said ring structures engaging the adjacent paddle and being forcibly rotatable relative to the respective coupler by the engaged paddle to a first or a second extreme position relative to the pinion pins after the teeth on the respective driver have climbed the teeth on the respective coupler, the ring structure preventing substantial re-engagement of the teeth on the respective driver and coupler when in one of the first and the second extreme position, and allowing engagement of the teeth on the respective driver and coupler when the ring structure is not near either the first or the second extreme position.

13. The positive acting differential of claim 12 wherein for assembly purposes, each driver has an inner bore to receive the spacer, said inner bore having an axial groove to permit the paddle on one end of the spacer to pass through the bore.

14. The positive acting differential of claim 12 wherein for assembly purposes, at least one paddle can be coupled to the spacer after the drivers are assembled to the spacer.

15. The positive acting differential of claim 12 wherein each paddle engages the respective ring structure between projections approximately diametrically opposed to a split in the ring structure.

16. The positive acting differential of claim 12 wherein each paddle engages the respective ring structure on ends of the ring structure facing a split in the ring structure.

17. The positive acting differential of claim 12 wherein each ring structure is further comprised of a synchro ring and a retaining member that holds the synchro ring in the forcibly rotatable position relative to the respective coupler.

18. The positive acting differential of claim 17 wherein the retaining member is a drag clip elastically engaging the annular groove in the respective coupler.

19. The positive acting of claim 18 wherein each paddle engages the respective drag clip causing the synchro ring and the drag clip to move substantially in unison.

20. The positive acting differential of claim 17 wherein each synchro ring is coaxial with the axis, and each synchro ring has a plurality of projections facing the respective driver, the respective driver having at least one protrusion extending to contact a respective projection on the synchro ring when the synchro ring is in either of the first and the second extreme positions to prevent substantial re-engagement of the teeth on the respective driver and coupler, and to not contact the respective projection on the synchro ring when the synchro ring is not near either the first or the second extreme position to allow re-engagement of base regions of the teeth on the respective driver and coupler.

21. The positive acting differential of claim 20 wherein the protrusion is an extended tooth and the drivers further comprise a plurality of extended teeth to contact the plurality of respective projections on the respective synchro ring.

22. The positive acting differential of claim 21 wherein tops of the plurality of projections on each synchro ring extend to adjacent but not beyond tops of the plurality of teeth on the respective coupler, and tops of the extended teeth on each driver are substantially coplanar with the rest of the teeth on the driver.

* * * * *